(12) United States Patent
Kouno et al.

(10) Patent No.: US 7,967,671 B2
(45) Date of Patent: Jun. 28, 2011

(54) GAME CONTROL PROGRAM, GAME CONTROL METHOD, AND GAME APPARATUS

(75) Inventors: Tsutomu Kouno, Tokyo (JP); Akira Takeuchi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1013 days.

(21) Appl. No.: 11/746,777

(22) Filed: May 10, 2007

(65) Prior Publication Data

US 2007/0265096 A1 Nov. 15, 2007

(30) Foreign Application Priority Data

May 15, 2006 (JP) .................. 2006-134773

(51) Int. Cl.
 A63F 13/00 (2006.01)
(52) U.S. Cl. ........... 463/12; 463/3; 463/4; 463/5; 463/6; 463/42
(58) Field of Classification Search .................. 463/2–5, 463/31
 See application file for complete search history.

(56) References Cited

U.S. PATENT DOCUMENTS

| | | | | |
|---|---|---|---|---|
| 4,309,030 | A * | 1/1982 | Goldfarb et al. | 463/7 |
| 6,217,448 | B1 * | 4/2001 | Olsen | 463/25 |
| 6,749,432 | B2 * | 6/2004 | French et al. | 434/247 |
| 2002/0065119 | A1 * | 5/2002 | Togami | 463/4 |
| 2004/0139217 | A1 * | 7/2004 | Kidney et al. | 709/232 |

FOREIGN PATENT DOCUMENTS

| | | |
|---|---|---|
| JP | 2000262766 | 9/2000 |
| JP | 2001129260 | 5/2001 |
| JP | 2003079957 | 3/2003 |
| JP | 2003-181144 | 7/2003 |
| JP | 2005253871 | 9/2005 |
| JP | 2006061242 | 3/2006 |
| JP | 2006102275 | 4/2006 |

OTHER PUBLICATIONS

Questioning dated May 7, 2009, from the corresponding Japanese Application.
Notification of Reason(s) for Refusal with translation dated Feb. 19, 2008, for corresponding Japanese Patent Application JP 2006-134773.
"Dai-rantou Smash Brothers", Nintendo 64 Kanpeki Kouryaku Series 13, Apr. 30, 1999, 1st ed., p. 11, Nintendo Allstar, Hissho Kouryaku Hou, Futabasha Inc. (without translation).
Decision of Refusal mailed Jul. 22, 2008 from the corresponding Japanese Application No. 2006-134773.
Trial Decision dated Jan. 25, 2011, from corresponding Japanese Application No. 2006-134773.

* cited by examiner

*Primary Examiner* — David L Lewis
*Assistant Examiner* — Werner Garner
(74) *Attorney, Agent, or Firm* — Katten Muchin Rosenman LLP (57) ABSTRACT

A game apparatus can achieve a game in which an object is transferred from one game apparatus to another by showing it flying on a screen. When a management data acquisition unit acquires management data indicating that the object is transferred to a game apparatus itself, an object control unit displays the object on-screen and accepts a user's operation instruction from an input unit. The object control unit determines whether or not the object is to be transferred in accordance with the user's operation instruction. A destination selection unit selects the destination of the object. A management data transmission unit transmits management data to the other game apparatuses. The object control unit updates a management data storing unit.

16 Claims, 10 Drawing Sheets

| TERMINAL ID | USER NAME | STATUS |
|---|---|---|
| 02 | player 2 | 0 |
| 01 | player 1 | 0 |
| 03 | player 3 | 0 |
| 04 | player 4 | 4 |

GAME CONTROL PROGRAM, GAME CONTROL METHOD, AND GAME APPARATUS

BACKGROUND OF THE INVENTION

1. Field of the Invention

The present invention relates to game control technologies, and more particularly to a game control program, a game control method, and a game apparatus which control a game in which an object such as a character is shown flying as if from one game apparatus to another.

2. Description of the Related Art

With the improvement of infrastructures such as wireless communications and the Internet, network games have been actively developed where plural game apparatuses are connected over a network to allow several players to mutually enjoy games.

In the initial phase of prevalence of network games, those carried over from existing versus games, role playing games and the like gained high popularity. With the maturity of the market today, novel network games enjoyable by a wide range of users have been awaited.

SUMMARY OF THE INVENTION

The present invention has been achieved in view of the foregoing circumstances. It is thus a general purpose of the present invention to provide a technology for realizing a game apparatus with improved entertainment capabilities.

One embodiment of the present invention relates to a game control program product. This game control program product is one for controlling a game in which an object is transferred from one game apparatus to another by showing it flying on a screen, the program product making a computer perform the functions of: controlling exchange of data among game apparatuses; displaying an object when receiving data indicating that the object is transferred from another game apparatus; accepting an instruction from a user to transfer the object to another game apparatus; selecting a destination game apparatus to which the object is transferred; and transmitting data, indicating that the object is transferred, to at least the selected destination game apparatus.

It should be appreciated that any combinations of the foregoing components, and any conversions of expressions of the present invention from/into methods, apparatuses, systems, and the like are also intended to constitute applicable embodiments of the present invention.

DETAILED DESCRIPTION OF THE INVENTION

The invention will now be described by reference to the preferred embodiments. This does not intend to limit the scope of the present invention, but to exemplify the invention.

Game apparatuses of the present embodiment provide a game in which an object such as a character is shown flying as if between game apparatuses that are capable of mutual communication over a network, thereby hitting the object toward each other so as not to drop it as if playing badminton, volleyball, etc. Hereinafter, the game apparatuses may also be referred to as "game terminals."

Figure 1:
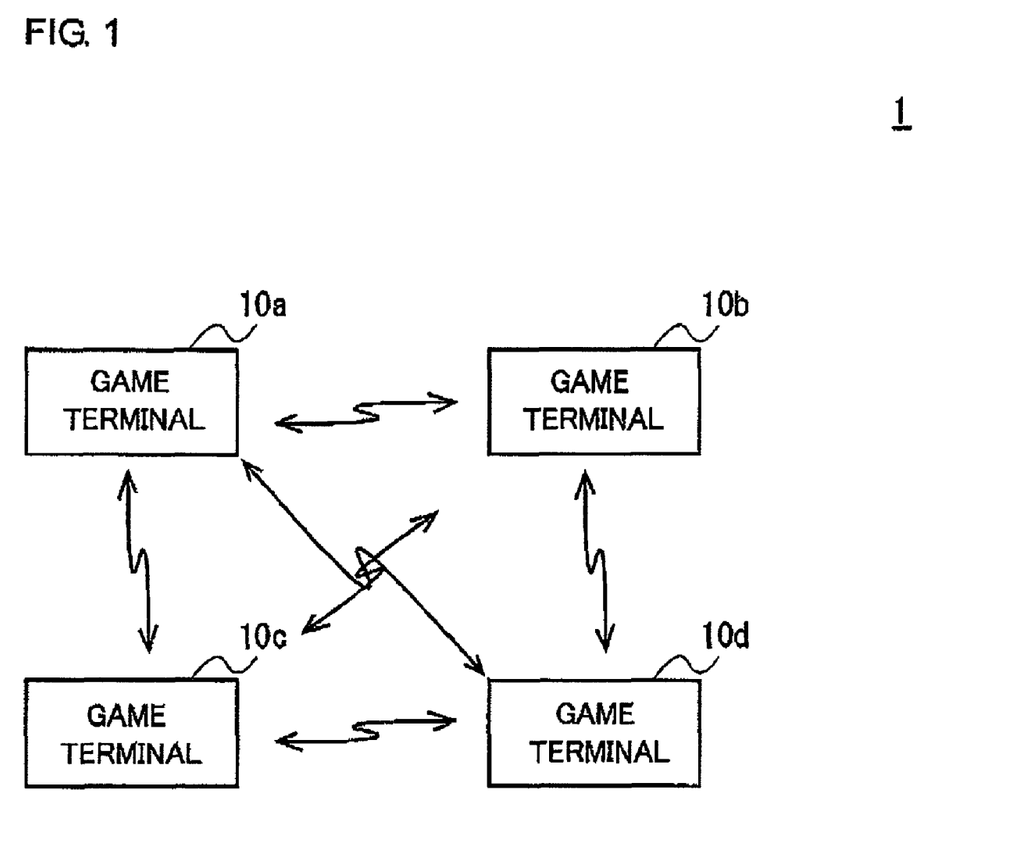
FIG. 1 is a diagram showing the configuration of a game system according to an embodiment.

FIG. 1 is a diagram showing the configuration of a game system according to the embodiment. In the game system 1, a plurality of game terminals 10a, 10b, 10c, and 10d (hereinafter, these will be referred to collectively as "game terminals 10") is connected so that they can communicate with each other over a wired or wireless network. The game terminals 10 exchange data with each other while playing a game. The game to be realized by the game system 1 has two game modes. One will be referred to as "match mode," in which the users of the respective game terminals 10 play a match against each other. The other will be referred to as "cooperative mode," in which the users cooperate with each other to attempt to show an object flying as if between the terminals as many times as possible. In the match mode, users who fail to show the object flying successfully for transfer drop out of the game until the last remaining user wins. In the cooperative mode, the number of times the object is successfully transferred is counted. Participants try to set a new record cooperatively.

Figure 2:
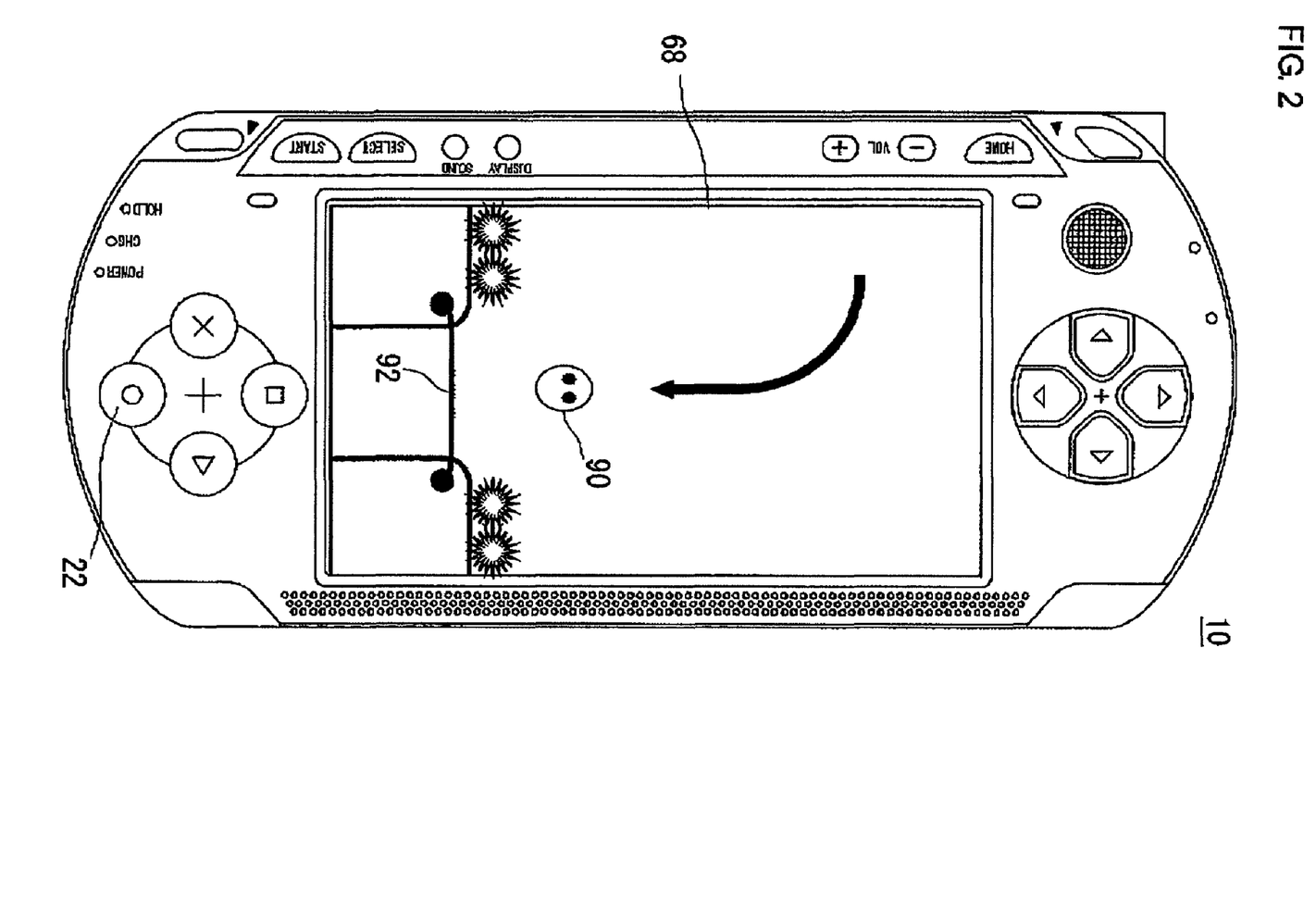
FIG. 2 is a diagram showing the appearance of a game apparatus and an example of a game screen according to the embodiment.

FIG. 2 shows the appearance of a game terminal 10 and an example of the game screen. When each game terminal 10 receives data indicating that an object is transferred from another game terminal 10 as if by air, it displays on a display device 68 the object 90 flying as if from outside the screen of the display device 68 and falling toward a trampoline 92. The game terminal 10 then accepts an operation instruction from the user to show the object 90 flying as if to another game terminal. The user may show the object 90 flying as if to another game terminal 10 by hitting, kicking, flipping, throwing, or the like. In the present embodiment, the user presses an input button 22 formed on the game terminal 10 to operate the trampoline 92 so that the object 90 bounces off the trampoline 92 toward another game terminal 10. If the user makes an operational error or makes an operation with bad timing, he/she fails to show the object 90 flying for transfer and the game ends.

The display device 68 displays only the trampoline 92 to be operated by the user, and does not show how the other users show the object 90 flying with their trampolines 92. This prevents the individual users from seeing the whole picture of the object 90 shown flying as if between the terminals, so that users cannot predict when the object 90 is shown flying as if to their own apparatuses. Consequently, it is possible to realize a simple but exciting game of moderate difficulty level, thereby providing new enjoyment that has not been available in conventional ball sports games etc.

Figure 3:
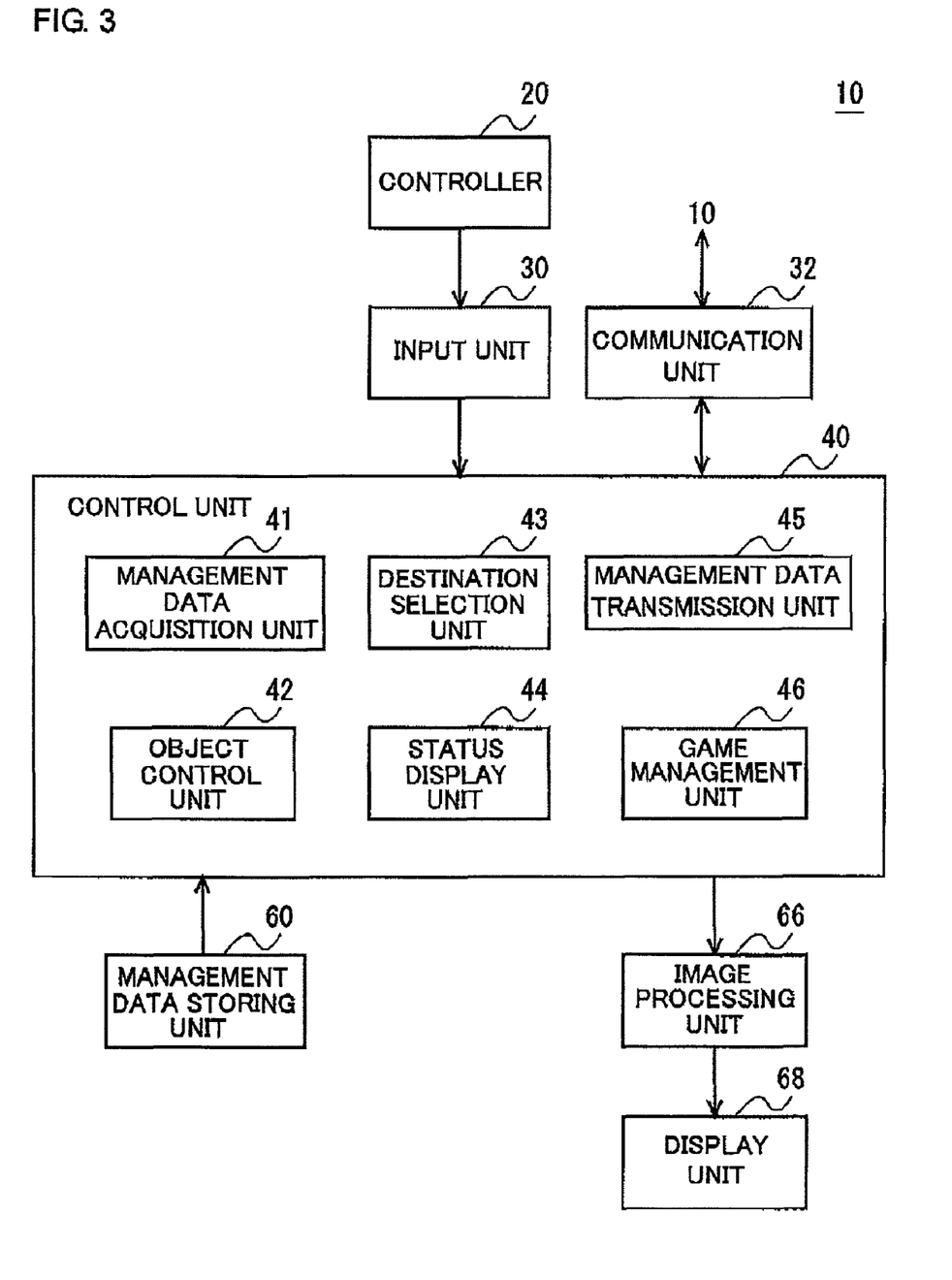
FIG. 3 is a diagram showing the configuration of the game apparatus according to the embodiment.

FIG. 3 shows the configuration of the game apparatus according to the embodiment. The game terminal 10 includes a controller 20, an input unit 30, a control unit 40, a management data storing unit 60, an image processing unit 66, and a display device 68. In terms of hardware, these components may be achieved by a CPU of an arbitrary computer, a memory, a program loaded into the memory, and the like, whereas this diagram only shows functional blocks to be achieved by cooperation of these components. It will thus be understood by those skilled in the art that these functional blocks may be achieved in various forms including hardware alone, software alone, and a combination of these.

The input unit 30 accepts control signals which are input from the controller 20 when operated by the user. The control unit 40 executes a game program based on user instructions accepted by the input unit 30, and causes the game to progress. The management data storing unit 60 stores management data for managing the progress of the game. For example, management data to be exchanged between the game terminals 10 include the following data: IDs, user names, and statuses of the respective game terminals 10 participating in the game; the current position of the object; the destination of the object; and the manner in which the object is shown flying. Of these, the management data storing unit 60 stores unique information, such as the IDs and user names, and status information on the respective game terminals 10. Information such as the destination of the object and the manner of being shown flying need not be stored in all the game terminals 10 since it is possible for the game to progress if such information is communicated at least to the game terminal 10 which is the destination of the object. However, as will be described later, game terminals 10 that are out of communication or game terminals 10 that have already failed and lost the game might inadvertently be selected as the destination of the object unless the statuses of the game terminals 10 participating in the game are grasped by all the game terminals 10. For this reason, each of the game terminals 10 stores the statuses of all the game terminals 10 in its management data storing unit 60. If any one of the game terminals 10 exercises centralized control on the whole game, that game terminal 10 may store and manage the statuses of all the game terminals 10 participating in the game. The image processing unit 66 generates a game screen to be controlled by the control unit 40, and displays it on the display device 68.

Figure 4:
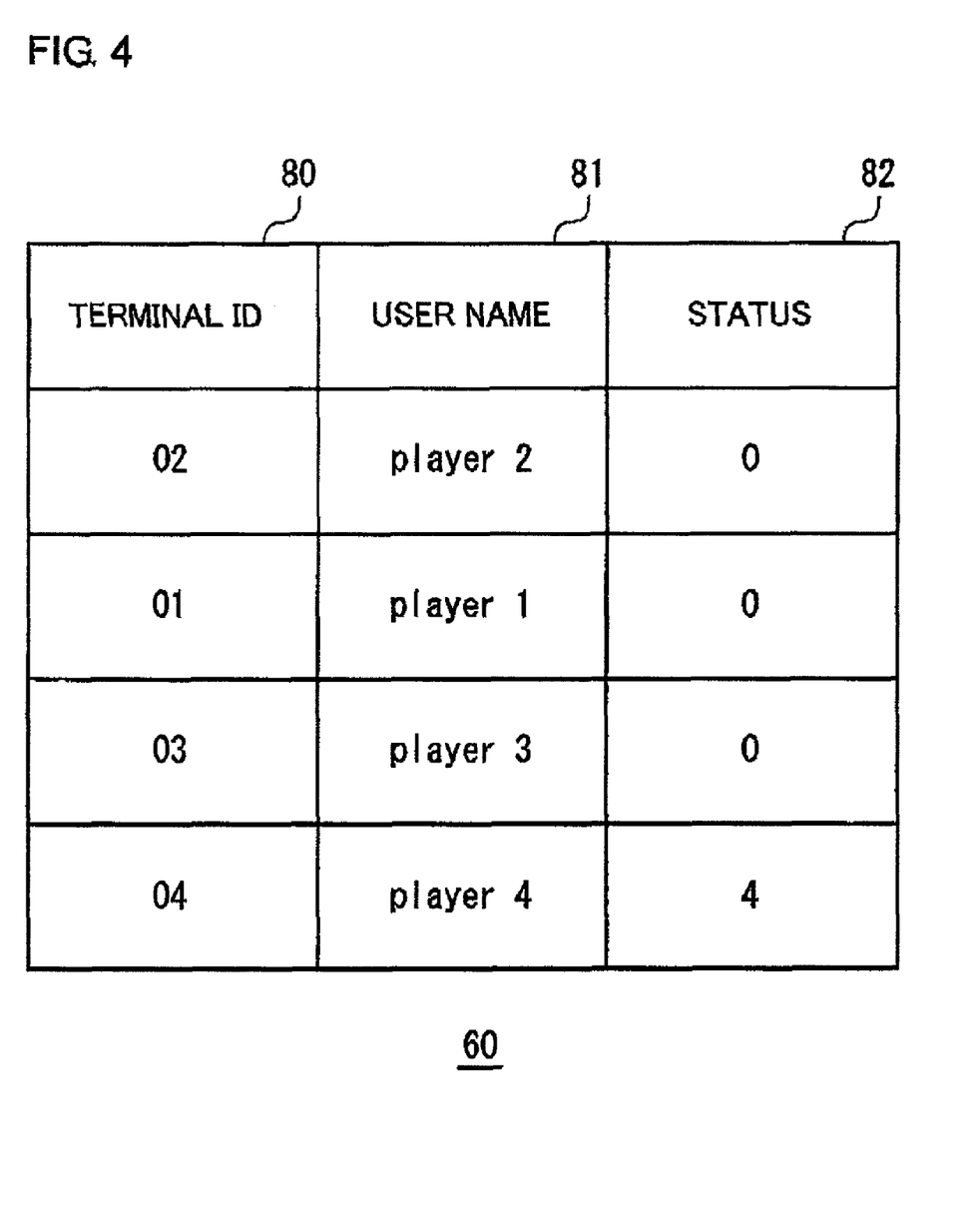
FIG. 4 is a diagram showing an example of internal data of a management data storing unit.

FIG. 4 shows an example of internal data in the management data storing unit 60. The management data storing unit 60 is provided with a terminal ID field 80, a user name field 81, and a status field 82. The terminal ID field 80 stores the terminal IDs of the game terminals 10 participating in the game. The user name field 81 stores the user names of the respective game terminals 10. The status field 82 stores information that indicates the statuses of the respective game terminals 10. For example, "0" is stored in the status field 82 when a game terminal 10 participating in the game is selectable as the destination of the object 90, and "−1" is stored when it is out of communication. If a terminal has already failed in the match mode and its rank has been fixed, the numerical value indicating the rank is stored.

The management data storing unit 60 may retain master data that indicates the status of the game apparatus itself and replica data that indicates the statuses of the other apparatuses. The master data, indicating the status of the game apparatus itself, is updated by an object control unit 42 and is communicated to the other apparatuses by a management data transmission unit 45. The replica data, indicating the statuses of the other apparatuses, is overwritten and updated with master data of the other apparatuses acquired by a management data acquisition unit 41. That is, the replica data are equivalent to the master data of the other game terminals 10 at a particular time in the past, and thus indicates the statuses of the game terminals 10 in the past. In order for each of the game terminals 10 to grasp the statuses of all the other game terminals 10 properly, each game terminal 10 receives the master data of all the other game terminals 10 periodically to update the replica data, thereby grasping the latest statuses as much as possible.

FIG. 4 shows an example of internal data in the management data storing unit 60 of the game terminal 10 that has an terminal ID of "02." The management data storing unit 60 contains master data regarding the game apparatus itself, i.e., the game terminal 10 having the terminal ID "02," and replica data regarding the other game terminals 10 participating in the game, hating terminal IDs of "01," "03," and "04." The status field 82 shows that the game terminal 10 having the terminal ID "04" has already failed in the match mode and ended in the lowest rank "4." The other game terminals 10 have "0" in the status field 82, which shows that those terminals 10 are yet to fail and are still playing the game.

Returning to FIG. 3, a description of the components will be continued. The control unit 40 includes a management data acquisition unit 41, the object control unit 42, a destination selection unit 43, a status display unit 44, a management data transmission unit 45, and a game management unit 46.

The management data acquisition unit 41 acquires management data, including parameters required for the progress of the game, from the other game terminals 10 through a communication unit 32. The management data acquisition unit 41 overwrites the replica data stored in the management data storing unit 60 with the master data of the other apparatuses constituting the acquired management data.

When the management data acquired by the management data acquisition unit 41 include data indicating that the object is transferred to the game apparatus itself as if by air, the object control unit 42 displays the object 90 on the display device 68 as shown in FIG. 2. Then, the object control unit 42 accepts an operation instruction from the user regarding the trampoline 92. The object control unit 42 makes a dynamic calculation and displays on the display device 68 the manner in which the object 90 falls on the trampoline 92 and bounces due to the elasticity of the trampoline 92, based on such factors as the mass, flying speed, and height of the object 90 and the elasticity of the trampoline 92. Accepting an operation instruction from the user regarding the trampoline 92, the object control unit 42 determines whether or not the object 90 is to be shown flying and how the object 90 should be shown flying.

Figure 5A:
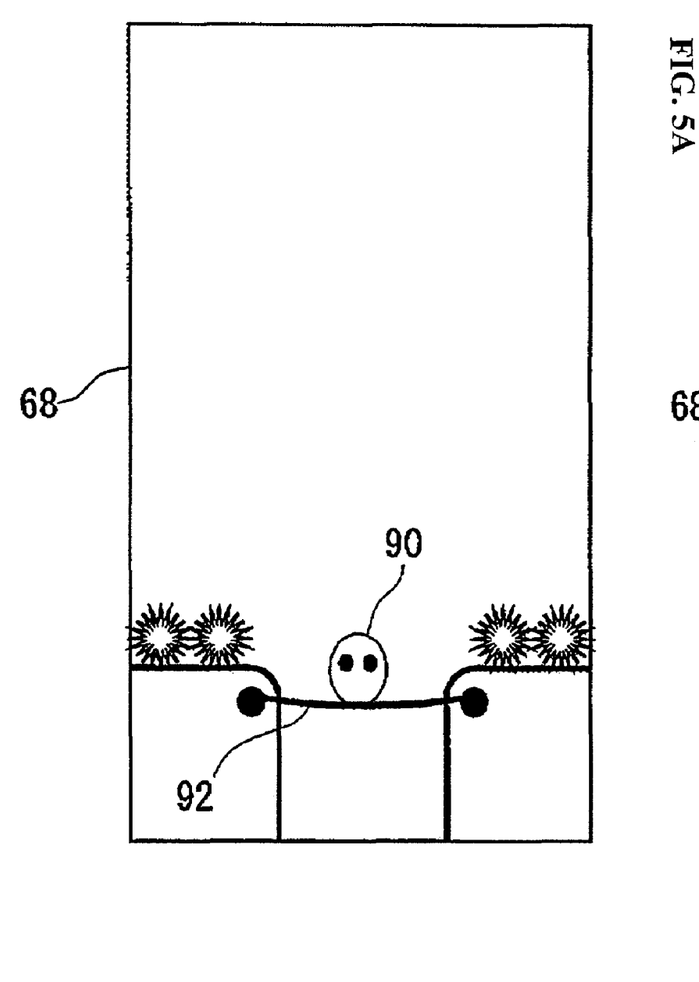
FIG. 5A is a diagram showing how an object falls toward a trampoline.
Figure 5B:
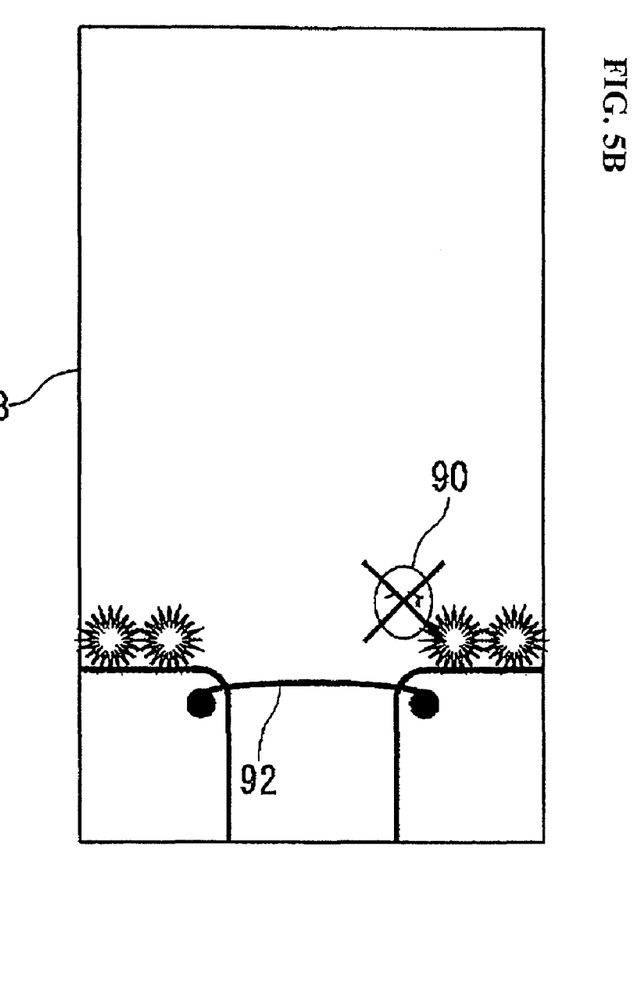
FIG. 5B is a diagram showing how it bounces off the trampoline.
Figure 6A:
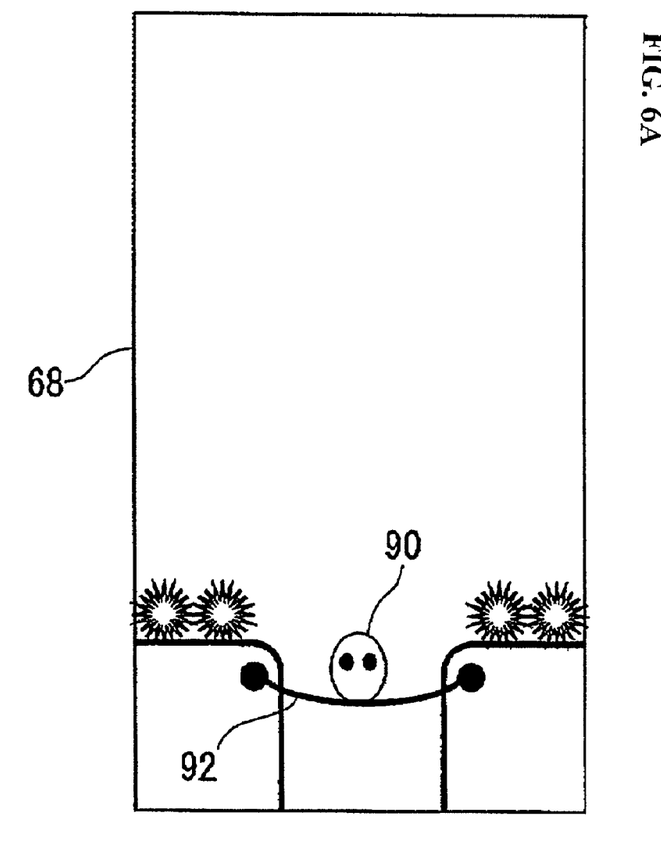
FIG. 6A is a diagram showing how the object falls toward the trampoline.
Figure 6B:
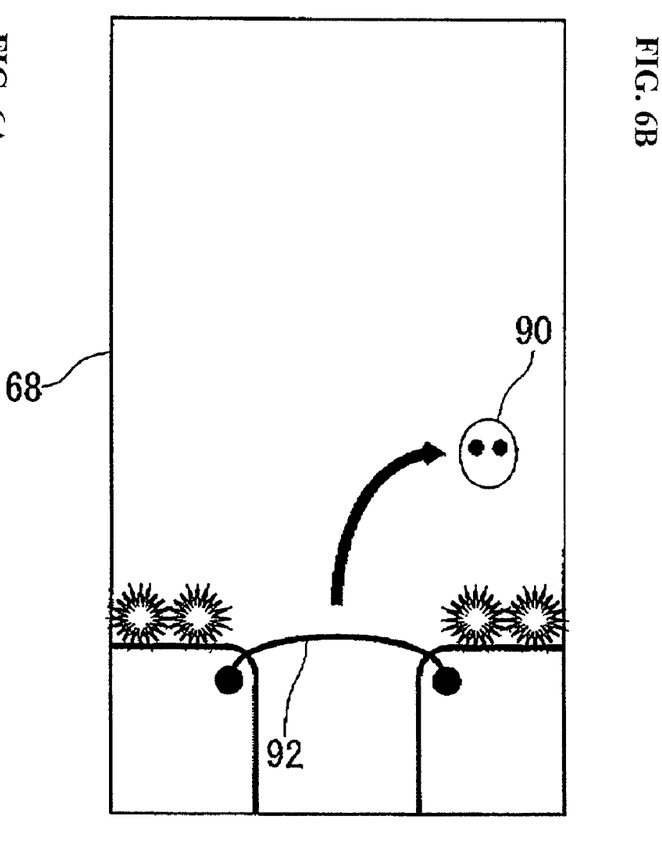
FIG. 6B is a diagram showing how it bounces off the trampoline.
Figure 7A:
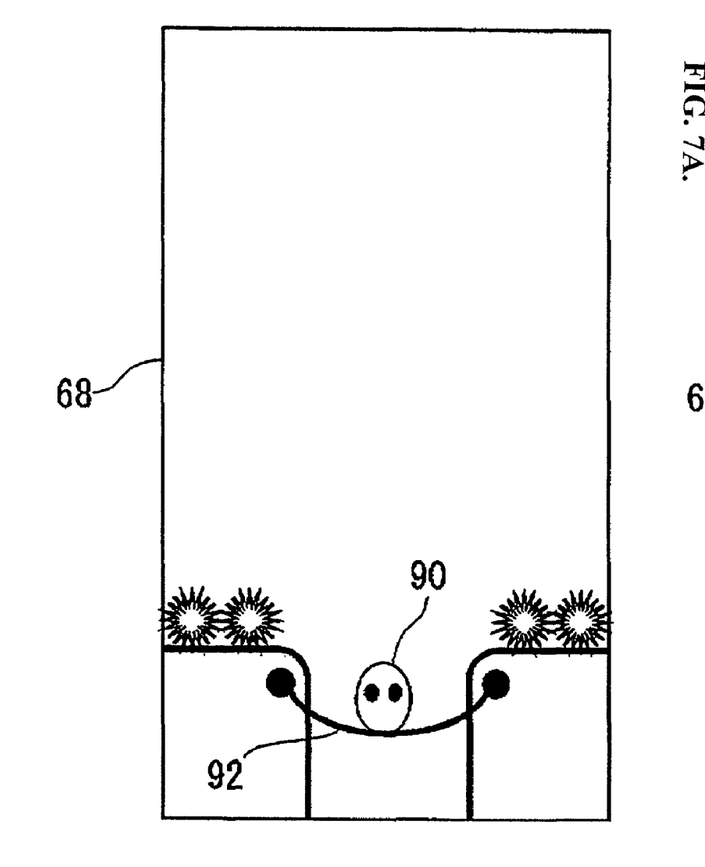
FIG. 7A is a diagram showing how the object falls toward the trampoline.
Figure 7B:
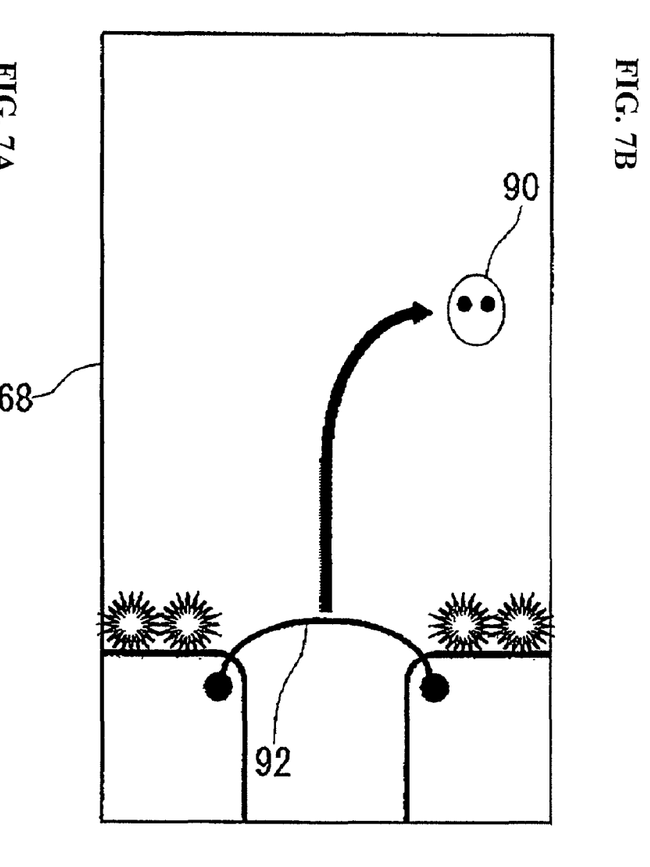
FIG. 7B is a diagram showing how it bounces off the trampoline.

FIG. 5A to 7B show how the object 90 falls on the trampoline 92 and how it bounces off the trampoline 92. FIG. 5A shows a case where the trampoline 92 is operated such that it stretches downwardly very little. Here, the trampoline 92 can hardly bounce the object 90 off and the attempt ends in failure as shown in FIG. 5B. FIG. 6A shows a case where the trampoline 92 is operated such that it stretches downward a little further. The trampoline 92 cannot bounce the object 90 off much, and the object 90 is shown flying low and in an unstable manner as shown in FIG. 6B. FIG. 7A shows a case where the trampoline 92 is operated such that it stretches downward as far as possible. The trampoline 92 can bounce the object 90 off properly in this case, and the object 90 is shown flying high and in a stable manner as shown in FIG. 7B.

The manner in which the object 90 is flies, determined by the object control unit 42, is communicated to a game terminal 10 that is selected as the destination of the object 90. When the object 90 appears flying in high and in a stable manner as shown in FIG. 7B, the destination game terminal 10 displays the object 90 as if it falls from the top of the screen of the display device 68. When the object 90 appears flying in low and in an unstable manner as shown in FIG. 6B, the destination game terminal 10 shows the object 90 as if it falls from a position lower than in FIG. 7B. When the object 90 appears flying in low and in an unstable manner, it therefore requires a quick response and increases the difficulty level because the object 90 will touch the trampoline 92 in a short time after being displayed. In the cooperative mode, it is preferred that the users operate their trampolines 92 properly to show the object 90 flying as in FIG. 7B so that the user of the game terminal 10 which is the destination of the object 90 can show it flying properly. In the match mode, on the other hand, a user might show the object 90 flying with intentionally incorrect timing so that the object 90 is shown flying as in FIG. 6B to force the other users into errors. This tactic, however, is prone to failures as shown in FIG. 5B, and thus requires more sophisticated skills.

When the user transfer the object 90 successfully with the trampoline 92, the destination selection unit 43 determines the game terminal 10 which is the destination of the object 90. The destination selection unit 43 refers to the management data storing unit 60 to acquire a list of game terminals 10 that are currently in the game, and selects a game terminal 10 to which the object 90 is transferred. When selecting the destination, the destination selection unit 43 excludes game terminals 10 that have an out-of-communication status in the status field 82 of the management data storing unit 60. Moreover, when selecting the destination in the match mode, the destination selection unit 43 also excludes game terminals 10 that have already failed to show the object flying for transfer and have a game-over status in the status field 82 of the management data storing unit 60. The destination selection unit 43 may generate a random number and select the destination game terminal 10 randomly using the generated random number. The destination selection unit 43 may determine the destination game terminal 10 based on an instruction from the user. For example, when the user presses the ○ (circle mark) button shown in FIG. 2, the destination selection unit 43 may select the destination at random. When the × (cross mark) button is pressed, a game terminal 10 having the next lower ID may be selected from among the game apparatuses participating in the game. When the Δ (triangle mark) button is pressed, a game terminal 10 having the next higher ID may be selected. When the □ (square mark) button is pressed, the source game terminal 10 from which the object 90 is transferred may be selected so as to hit the object 90 as displayed. Alternatively, the user may select the destination game terminal 10 using arrow keys or the like.

The status display unit 44 causes the display device 68 to display the statuses of the other terminals 10 participating in the game. As described previously, the present embodiment provides the fun of having the object 90 shown flying in suddenly by having the display device 68 display only how the game apparatus itself makes the object fly to the other game terminals 10 but not how the other game terminals 10 make the object fly. Nevertheless, if the statuses of the other game terminals 10 are totally invisible, it might be frustrating to the users if the object 90 is not shown flying as if to their own apparatuses for a while. The users will not know whether their apparatuses are simply yet to be selected as the destination or whether the apparatus is not properly operated due to problems such as a communication failure. Therefore, the status display unit 44 refers to the management data acquired from the other apparatuses, and concisely displays the statuses of the other game terminals 10 and the object 90 on the display device 68.

Figure 8:
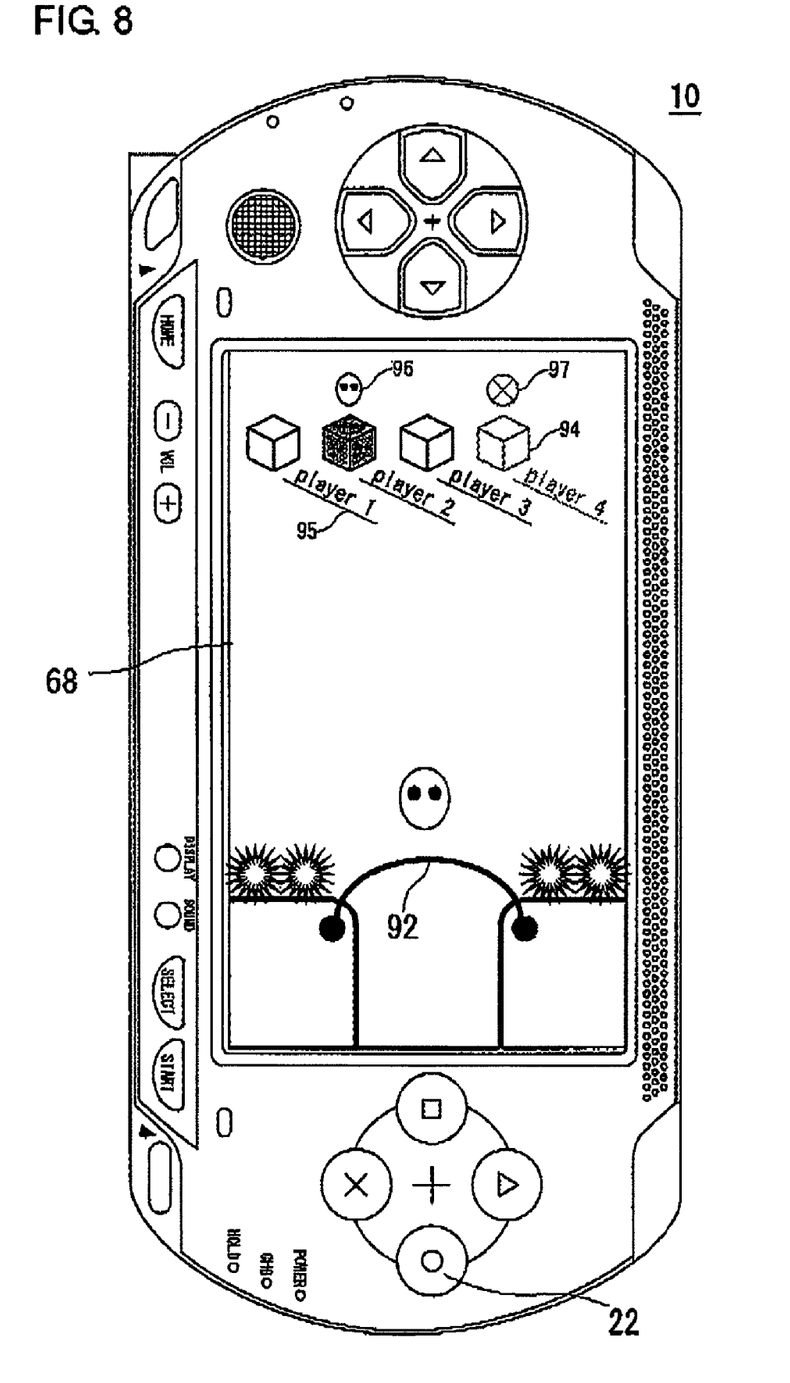
FIG. 8 is a diagram showing an apparatus where a status display unit displays the statuses of respective game terminals.

FIG. 8 shows how the status display unit 44 displays the statuses of the respective game terminals 10. The game terminals 10 participating in the game are listed at the top of the screen of the display device 68. The cube icons 94 represent the game terminals 10 participating in the game, and identification information 95 for identifying the game terminals 10, such as a user name, is shown to the lower right of the respective icons 94. The apparatus identifies itself with the filled icon 94 of "player 2." An icon 96 displayed above the icons 94 indicates which game terminal 10 the object 90 is currently shown flying in. The icon 94 and identification information 95 for "player 4" are grayed out, accompanied with an icon 97 which indicates that this game terminal 10 has already failed and dropped, or is out of communication. Here, the rank of the game terminal 10 may be displayed when it has already failed.

The destination selection unit 43 may utilize the display made by the status display unit 44 when accepting a user instruction for selecting the destination. For example, when the user flips back the object 90 as displayed with the trampoline 92, a cursor may be displayed to draw a square around the icons 94 to allow a selection of the destination game terminal 10 while the object 90 is shown flying above. At this point, the user can move the cursor to select a destination game terminal 10 by operating the arrow keys or the like, and press an enter key so that the destination selection unit 43 fixes the selected game terminal 10 as the destination.

The game management unit 46 acquires management data, which indicates whether or not the object 90 is successfully transferred, from the game terminals 10 participating in the game, and manages the progress of the game in the match mode or in the cooperative mode. In the match mode, the game management unit 46 determines the rank of a failed game terminal 10 and stores it into the status field 82 of the management data storing unit 60 when it receives management data from any of the game terminals 10 indicating that it failed to transfer the object, or when the object control unit 42 determines that the game apparatus itself fails. The game management unit 46 refers to the status field 82 of the management data storing unit 60, and stores the number of game terminals 10 participating in the game as the rank of the failed game terminal 10 if there is no game terminal 10 that has already failed and been fixed in rank. If there are any game terminals 10 that have already failed and been fixed in rank, the game management unit 46 subtracts one from the highest rank among those apparatuses, and stores the result as the rank. The game terminal(s) 10 having failed and been fixed in rank will no longer be selected as the destination of the object by the destination selection unit 43.

In the cooperative mode, the game management unit 46 counts the number of successes when it receives management data, indicating that the object is transferred successfully, from any of the game terminals 10. When the gate management unit 46 receives management data indicating that one of the game terminals 10 has failed to transfer the object, it ends the game at that point and displays the count of the number of successes as a current score. The game management unit 46 also records a past score in a nonvolatile memory, and if the current score exceeds the past score, updates the new record with the current score.

The functions of the game management unit 46 may be exercised in all the game terminals 10 participating in the game. Alternatively, any one of the game terminals 10 may exclusively control the game in a centralized fashion, and transmit the management data to the other game terminals 10 for control. Moreover, a management server for managing the game may be provided additionally to the game terminals 10. In this case, the game terminals 10 need not have the game management unit 46

The management data transmission unit 45 transmits the management data to the other game terminals 10 through the communication unit 32. When transferring the object to another game terminal 10 as if by air, the management data transmission unit 45 may transmit management data that indicates the destination of the object and the manner in which the object is shown flying only to the game terminal 10 that is selected as the destination. In this case, the management data is transferred between the game terminals 10 as the object 90 itself in the same way as when playing badminton or the like in the real world. In the match mode, game terminals 10 failing to transfer the object may broadcast management data that indicates their failure to all the game terminals 10 participating in the game so that the failed game terminals 10 will not subsequently be selected as the destination of the object.

When the object is transferred to the game apparatus itself, the management data transmission unit 45 thereof may broadcast management data to the other game terminals 10 indicating whether or not the apparatus is successful in transferring the object, regardless of success or failure. This allows all the game terminals 10 to grasp the progress of the game. Since inconsistency might occur between game terminals 10 for some reason, however, one of the game terminals 10 may serve as a master to manage the progress of the game in a centralized fashion.

In order to check whether or not the game terminals 10 are in communication, the management data transmission unit 45 may transmit some kind of data to the other game terminals 10, e.g., every 60 frames (1 second). For example, it may transmit master data that indicates the status of the game apparatus itself stored in the management data storing unit 60. The management data transmission unit 45 may transmit the master data indicating the status of the game apparatus itself to all the game terminals 10 participating in the game, or may transmit the master data only to the game terminal 10 or server that manages the game in a centralized fashion. When the management data acquisition unit 41 receives master data indicating the status of another apparatus from the game terminal 10, it overwrites the replica data regarding that game terminal 10, stored in the management data storing unit 60, with the master data received. If the management data acquisition unit 41 does not receive any master data from a game terminal 10 participating in the game over a predetermined period of time, it determines that the game terminal 10 is out of communication. The management data acquisition unit 41 then stores "−1," which indicates that it is out of communication, in the status field 82 of that game terminal 10 in the management data storing unit 60. The game terminal 10 that is out of communication will not subsequently be selected as the destination of the object by the destination selection unit 43.

In the match mode, if any of the game terminals 10 participating in the game is determined to be out of communication, the management data acquisition unit 41 may determine as if that game terminal 10 had not participated in the game from the beginning. That is, when the status field 82 of the management data storing unit 60 includes any game terminals 10 that have already failed and been given a rank, their ranks may be raised by the number of game terminals 10 out of communication.

Figure 9:
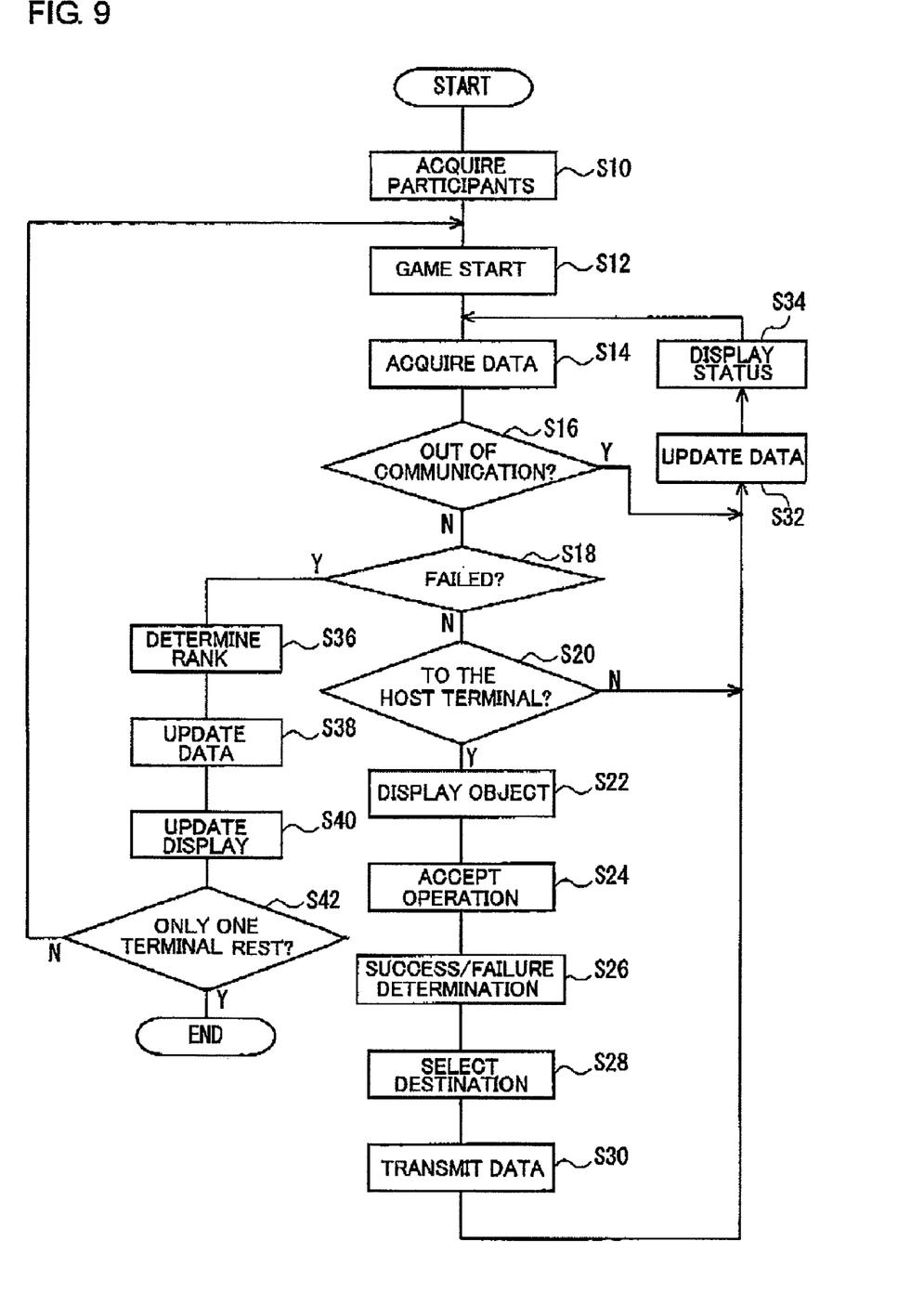
FIG. 9 is a flowchart showing the procedure of a game control method according to the embodiment.

FIG. 9 is a flowchart showing the procedure of a game control method according to the present embodiment. FIG. 9 shows the procedure of the game control method in the match mode. A game terminal 10 which serves as a game administrator calls for participation in the game by other game terminals 10 in communication, and acquires management data from participants (S10). When participants are ready, the administrator game terminal 10 transmits the management data regarding all the game terminals 10 to the participant game terminals 10 and starts the game (S12). At this point, the management data acquisition units 41 of the participant game terminals 10 store the acquired management data in their respective management data storing units 60.

The administrator game terminal 10 initially transfer the object 90 to another game terminal 10 by showing it flying and transmits management data. Each game terminal 10 acquires the management data (S14), and performs necessary processing to make the game progress according to the management data acquired. If the acquired management data indicate that any of the game terminals 10 goes out of communication, or if management data are not received from a game terminal 10 over a predetermined period of time (Y at S16), the management data acquisition unit 41 updates the corresponding status field 82 of that game terminal 10 in the management data storing unit 60 (S32). The status display unit 44 updates the display mode of the icon 94 of that game terminal 10 so as to indicate that it is out of communication (S34). When the processing for monitoring the communication statuses is complete, the procedure returns to S12.

If the acquired management data indicate that any of the game terminals 10 failed to transfer the object 90 (Y at S18), the game management unit 46 determines the rank of that game terminal 10 (S36). The game management unit 46 then stores the rank in the corresponding status field 82 of that game terminal 10 in the management data storing unit 60 (S38). The status display unit 44 updates the display mode of the icon 94 of that game terminal 10 so as to indicate that it has already failed (S40). If the number of game terminals 10 that have not failed is only one (Y at S42), it follows that all the game terminals 10 participating in the game are fixed in rank and the game ends. If two or more game terminals 10 remain (N at S42), the procedure returns to S12 to start the game again. When starting the game anew, the object 90 may be served from the administrator game terminal 10 or from a game terminal 10 that had been selected by the failed game terminal 10 as the destination of the object 90. The game need not necessarily be suspended before restart. That is, if any of the game terminals 10 fails to transfer the object, a game terminal 10 that is selected as the next destination may continue the game as if the object 90 is transferred normally.

If the acquired management data indicate that the object 90 is transferred to the game apparatus itself (Y at S20), the object control unit 42 displays the object 90 on-screen (S22), and accepts a user's operation instruction from the input unit 30 (S24). The object control unit 42 determines whether or not the object 90 is to be shown flying successfully according to the user's operation instruction (S26). The destination selection unit 43 selects the destination of the object 90 (S28). The management data transmission unit 45 transmits management data to the other game terminals 10 (S30). The object control unit 42 updates the master data in the management data storing unit 60 (S32). The status display unit 44 moves the icon 96 of the object 90 to be above the destination game terminal 10 (S34). When the processing for transferring the object 90 to another game terminal 10 is complete, the procedure returns to S14.

If the acquired management data are master data regarding another apparatus (N at S20), the management data acquisition unit 41 updates the replica data in the management data storing unit 60 with the acquired master data (S32). The status display unit 44 updates the display of the icons 94 of the respective game terminals 10 if necessary (S34). For example, if the object 90 is transferred from one game terminal 10 to another game terminal 10 and thus changes in current position, the icon 96 of the object 90 is moved to be above the icon 94 of the destination game terminal 10. When the processing for updating the management data is complete, the procedure returns to S14.

Figure 10:
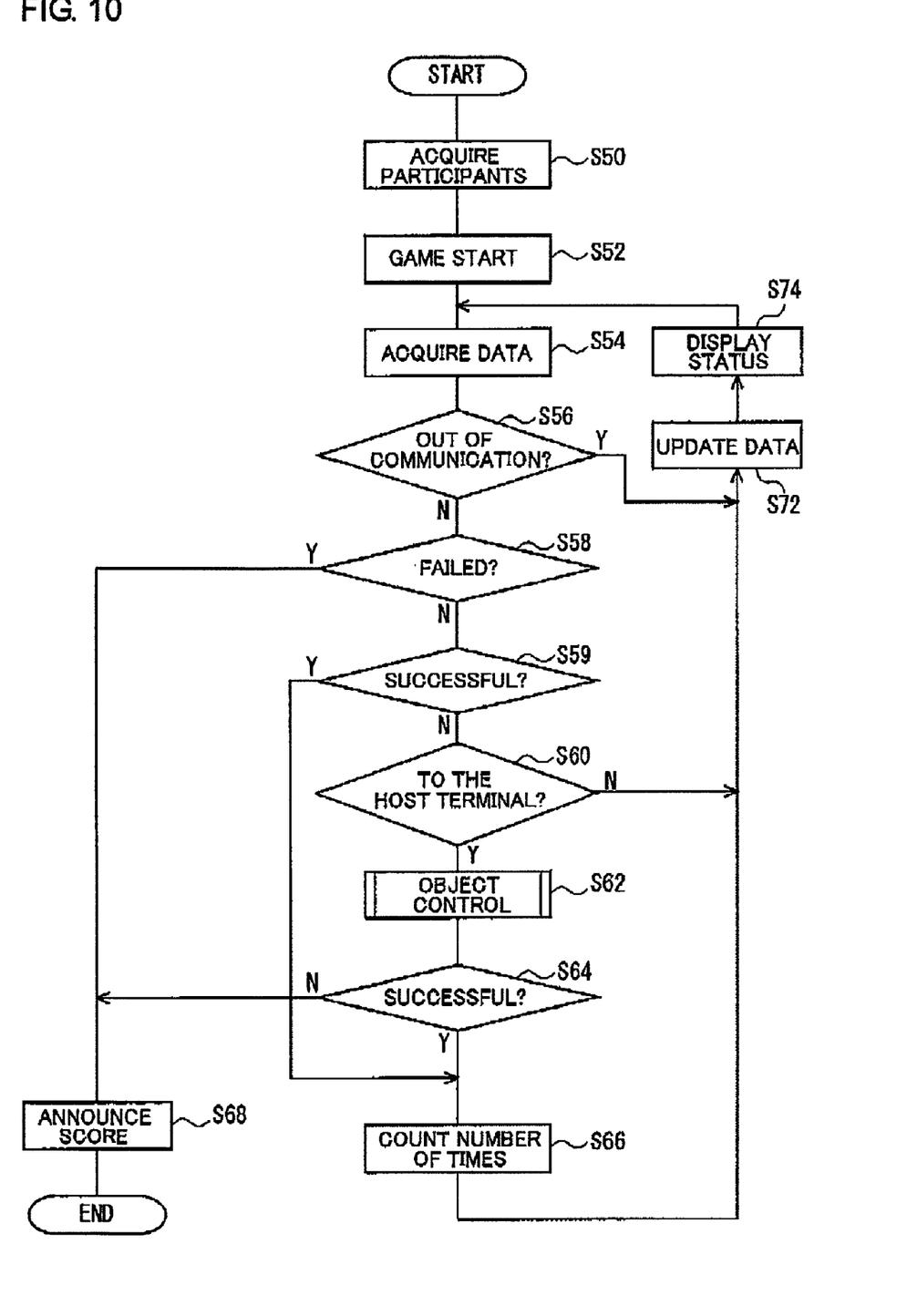
FIG. 10 is a flowchart showing the procedure of the game control method according to the embodiment.

FIG. 10 is a flowchart showing the procedure of the game control method according to the present embodiment. FIG. 10 shows the procedure of the game control method in the cooperative mode. A game terminal 10 which serves as a game administrator calls for participation in the game by other game terminals 10 capable of communication, and acquires management data from participants (S50). When participants are ready, the administrator game terminal 10 transmits the management data regarding all the game terminals 10 to the participant game terminals 10 and starts the game (S52). At this point, the management data acquisition units 41 of the participant game terminals 10 store the acquired management data in their respective management data storing units 60.

The administrator game terminal 10 initially serves the object 90 to another game terminal 10 and transmits management data. Each game terminal 10 acquires the management data (S54), and performs necessary processing to make the game progress according to the management data acquired. If the acquired management data indicate that any of the game terminals 10 goes out of communication, or if management data are not received from a game terminal 10 over a predetermined period of time (Y at S56), the management data acquisition unit 41 updates the corresponding status field 82 of that game terminal 10 in the management data storing unit 60 (S72). The status display unit 44 updates the display mode of the icon 94 of that game terminal 10 so as to indicate that it is out of communication (S74). When the processing for monitoring the communication statuses is complete, the procedure returns to S54.

If the acquired management data indicate that any of the game terminals 10 failed to transfer the object 90 (Y at S58), the game management unit 46 shows the number of successes at this point to announce the score (S68) and ends the game. At this point, if the past record is broken, the record is overwritten.

If the acquired management data indicate that any of the game terminals 10 transfers the object 90 successfully (Y at S59) the game management unit 46 increments the count of the number of successes (S66). The management data acquisition unit 41 updates the replica data in the management data storing unit 60 with the acquired master data (S72). The status display unit 44 moves the icon 96 of the object 90 to be above the icon 94 of the destination game terminal 10. When the processing for updating the management data is complete, the procedure returns to S54.

If the acquired management data indicate that the object 90 is transferred to the game apparatus itself (Y at S60), then processing for controlling the incoming object 90, namely, the processing from S22 to S30 of FIG. 9 is performed (S62). If the user of the apparatus is unable to transfer the object 90 (N at S64), the game management unit 46 announces the score (S68) and ends the game. If the user of the apparatus is successful (Y at S64), the game management unit 46 increments the count of the number of successes (S66). The object control unit 42 updates the master data in the management data storing unit 60 (S72). The status display unit 44 moves the icon 96 of the object to be above the destination game terminal 10 (S74). When the processing for updating the management data is complete, the procedure returns to S54.

If the acquired management data are master data regarding another apparatus (N at S60), the management data acquisition unit 41 updates the replica data in the management data storing unit 60 with the acquired master data (S72). The status display unit 44 updates the display of the icons 94 of the respective game terminals 10 if necessary (S74). When the processing for updating the management data is complete, the procedure returns to S54.

As has been described, since the simple rule, in which an object such as a character is shown flying as if from one game apparatus to another without being dropped, is adopted, it is possible to achieve a friendly game acceptable to a wide range of users.

Up to this point, the present invention has been described in conjunction with the embodiment thereof. This embodiment has been given solely by way of illustration. It will be understood by those skilled in the art that various modifications may be made to combinations of the foregoing components and processes, and all such modifications are also intended to fall within the scope of the present invention.

The size of the object 90 may be changed to adjust the difficulty level of the game. In general, the smaller the object 90 is, the harder the operations of hitting, kicking, and flipping the object 90 are to make. The object control unit 42 may change the display size of the object 90 depending on the levels of users, thereby providing the users with differing odds. Moreover, it is possible to display a plurality of objects 90 flying at the same time. The number of objects 90 may be determined by the administrator game terminal 10, based on the number of game terminals 10 participating and the levels of the users.

What is claimed is:

1. A game control program product, embedded in a non-transitory computer readable storage medium, for controlling a game in which an object is transferred from or to a plurality of other game apparatuses by showing it flying on a screen, the program product comprising modules for:

controlling exchange of data with the plurality of other game apparatuses;

displaying the object when receiving data indicating that the object is transferred from one of the plurality of other game apparatuses to a game apparatus itself;

accepting an instruction from a user to transfer the object to one of the plurality of other game apparatuses;

determining whether or not the object is to be transferred to one of the plurality of other game apparatuses in accordance with content or timing of a user instruction accepted by the module for accepting an instruction;

ensuring, when it is determined that the game apparatus itself failed to transfer the object to one of the plurality of other game apparatus, that the game apparatus that failed to transfer the object is not selected as a destination of the object;

selecting a destination game apparatus to which the object is transferred when it is determined that the game apparatus itself succeeds in transferring the object to one of the plurality of other game apparatuses;

transmitting data, indicating that the object is transferred, to at least the selected destination game apparatus, and displaying a list of game apparatuses that are selectable as the destination of the object, and displaying the destination game apparatus of the object so that it can be identified in the list if data for identifying the game apparatus that is the destination of the object is received from another game apparatus and the game apparatus itself is not the destination of the object.

2. The game control program product according to claim 1, further comprising a module for determining a manner in which the object is shown flying in accordance with timing and/or content of a user instruction accepted by the module for accepting an instruction.

3. The game control program product according to claim 1, wherein the module for transmitting transmits data for identifying the destination game apparatus of the object and data for indicating a manner in which the object is shown flying.

4. The game control program product according to claim 1, wherein the module for selecting acquires information regarding game apparatuses that are selectable as the destination of the object, and randomly selects the destination game apparatus to transfer the object to from among those game apparatuses.

5. The game control program product according to claim 1, wherein the module for selecting acquires information regarding game apparatuses that are selectable as the destination of the object, and accepts a selection instruction from the user as to which of the game apparatuses that are selectable to transfer the object to.

6. The game control program product according to claim 1, further comprising a module for checking if the game apparatus participating in the game is in communication during the game, and wherein
the module for selecting does not select a game apparatus that is out of communication as the destination of the object.

7. The game control program product according to claim 1, further comprising modules for: receiving data, indicating whether or not the object is transferred successfully, from the game apparatus participating in the game; and managing progress of the game.

8. The game control program product according to claim 7, wherein the module for managing determines the rank of a game apparatus participating in the game and does not select the game apparatus as the destination of the object subsequently when data received from the game apparatus indicate that it failed to transfer the object.

9. The game control program product according to claim 7, wherein the module for managing receives data, indicating that the object is transferred successfully, from the game apparatus participating in the game, and counts the number of successes.

10. A game control program product, embedded in a non-transitory computer readable storage medium, for controlling a game in which an object is transferred from or to a plurality of other game apparatuses by showing it flying on a screen, the program product comprising modules for:
controlling exchange of data with the plurality of other game apparatuses;
displaying the object when receiving data indicating that the object is transferred from one of the other game apparatuses to a game apparatus itself;
accepting an instruction from a user to transfer the object to one of the other game apparatuses;
determining whether or not the object is to be transferred to one of the plurality of other game apparatuses in accordance with content or timing of a user instruction accepted by the module for accepting an instruction;
ensuring, when it is determined that the game apparatus itself failed to transfer the object to one of the plurality of other game apparatus, that the game apparatus that failed to transfer the object is not selected as a destination of the object;
selecting a destination game apparatus to which the object is transferred when it is determined that the game apparatus itself succeeds in transferring the object to one of the plurality of other game apparatuses; and
transmitting data, indicating that the object is transferred, to at least the selected destination game apparatus, wherein
the module for transmitting transmits data, indicating the failure of the game apparatus itself, to the other game apparatus when the module for determining determines that the game apparatus itself failed to transfer the object to another game apparatus.

11. A game apparatus comprising:
a communication unit which controls exchange of data with a plurality of other game apparatuses;
a display unit which displays an object when data, indicating that the object is transferred from one of the plurality of other game apparatuses to the game apparatus itself, is received through the communication unit;
an accepting unit which accepts a user instruction to transfer the object to one of the plurality of other game apparatuses;
an object control unit which determines whether or not the object is to be transferred to one of the plurality of other game apparatuses in accordance with content or timing of the user instruction accepted by the accepting unit;
a game management unit which, when it is determined that the game apparatus itself failed to transfer the object to one of the plurality of other game apparatus, ensures that the game apparatus that failed to transfer the object is not selected as a destination of the object;
a selection unit which selects a destination game apparatus to transfer the object to when it is determined that the game apparatus itself succeeds in transferring the object to one of the plurality of other game apparatuses;
a transmission unit which transmits data, indicating the transfer of the object, to at least the selected game apparatus; and
a status display unit which displays a list of game apparatuses that are selectable as the destination of the object, and displays the destination game apparatus of the object so that it can be identified in the list if data for identifying the game apparatus that is the destination of the object is received from another game apparatus and the game apparatus itself is not the destination of the object.

12. A game control method comprising:
displaying an object when receiving data indicating that the object is transferred from one of a plurality of other game apparatuses to a game apparatus itself;
accepting an instruction from a user to transfer the object to one of the plurality of other game apparatuses;
determining whether or not the object is to be transferred to one of the plurality of other game apparatuses in accordance with content or timing of a user instruction;
ensuring, when it is determined that the game apparatus itself failed to transfer the object to one of the plurality of other game apparatus, that the game apparatus that failed to transfer the object is not selected as a destination of the object;
selecting a destination game apparatus to transfer the object to when it is determined that the game apparatus itself succeeds in transferring the object to one of the plurality of other game apparatuses;

transmitting data, indicating the transfer of the object, to at least the selected game apparatus; and displaying a list of game apparatuses that are selectable as the destination of the object, and displaying the destination game apparatus of the object so that it can be identified in the list if data for identifying the game apparatus that is the destination of the object is received from another game apparatus and the game apparatus itself is not the destination of the object.

13. A non-transitory computer-readable recording medium containing a program product comprising modules for:

controlling exchange of data with a plurality of other game apparatuses;

displaying an object when receiving data indicating that the object is transferred from one of the plurality of other game apparatuses to a game apparatus itself;

accepting an instruction from a user to transfer the object to one of the plurality of other game apparatuses;

determining whether or not the object is to be transferred to one of the plurality of other game apparatuses in accordance with content or timing of a user instruction accepted by the module for accepting an instruction;

ensuring, when it is determined that the game apparatus itself failed to transfer the object to one of the plurality of other game apparatus, that the game apparatus that failed to transfer the object is not selected as a destination of the object;

selecting a destination game apparatus to transfer the object to when it is determined that the game apparatus itself succeeds in transferring the object to one of the plurality of other game apparatuses;

transmitting data, indicating the transfer of the object, to at least the selected game apparatus; and displaying a list of game apparatuses that are selectable as the destination of the object, and displaying the destination game apparatus of the object so that it can be identified in the list if data for identifying the game apparatus that is the destination of the object is received from another game apparatus and the game apparatus itself is not the destination of the object.

14. A game apparatus comprising:

a communication unit which controls exchange of data with a plurality of other game apparatuses;

a display unit which displays an object when data, indicating that the object is transferred from one of the plurality of other game apparatuses to the game apparatus itself, is received through the communication unit;

an accepting unit which accepts a user instruction to transfer the object to one of the plurality of other game apparatuses;

an object control unit which determines whether or not the object is to be transferred to one of the plurality of other game apparatuses in accordance with content or timing of the user instruction accepted by the accepting unit;

a game management unit which, when it is determined that the game apparatus itself failed to transfer the object to one of the plurality of other game apparatus, ensures that the game apparatus that failed to transfer the object is not selected as a destination of the object;

a selection unit which selects a destination game apparatus to transfer the object to when it is determined that the game apparatus itself succeeds in transferring the object to one of the plurality of other game apparatuses; and a transmission unit which transmits data, indicating the transfer of the object, to at least the selected game apparatus, wherein said transmission unit transmits data, indicating the failure of the game apparatus itself, to the other game apparatus when said object control unit determines that the game apparatus itself failed to transfer the object to another game apparatus.

15. A game control method comprising:

displaying an object when receiving data indicating that the object is transferred from one of a plurality of other game apparatuses to a game apparatus itself;

accepting a user instruction to transfer the object to one of the plurality of other game apparatuses;

determining whether or not the object is to be transferred to one of the plurality of other game apparatuses in accordance with content or timing of the user instruction;

ensuring, when it is determined that the game apparatus itself failed to transfer the object to one of the plurality of other game apparatus, that the game apparatus that failed to transfer the object is not selected as a destination of the object;

selecting a destination game apparatus to transfer the object to when it is determined that the game apparatus itself succeeds in transferring the object to one of the plurality of other game apparatuses; and transmitting data, indicating the transfer of the object, to at least the destination game apparatus, wherein said transmitting transmits data, indicating the failure of the game apparatus itself, to the destination game apparatus when said determining determines that the game apparatus itself failed to transfer the object to the destination game apparatus.

16. A non-transitory computer-readable recording medium containing a program product comprising modules for:

controlling exchange of data with a plurality of other game apparatuses;

displaying an object when receiving data indicating that the object is transferred from one of the plurality of other game apparatuses to a game apparatus itself;

accepting an instruction from a user to transfer the object to one of the plurality of other game apparatuses;

determining whether or not the object is to be transferred to one of the plurality of other game apparatuses in accordance with content or timing of a user instruction accepted by the module for accepting an instruction;

ensuring, when it is determined that the game apparatus itself failed to transfer the object to one of the plurality of other game apparatuses, that the game apparatus that failed to transfer the object is not selected as a destination of the object;

selecting a destination game apparatus to which the object is transferred when it is determined that the game apparatus itself succeeds in transferring the object to one of the plurality of other game apparatuses; and transmitting data, indicating that the object is transferred, to at least the selected destination game apparatus, wherein:

the module for transmitting transmits data, indicating the failure of the game apparatus itself, to the plurality of other game apparatuses when the module for determining determines that the game apparatus itself failed to transfer the object to one of the plurality of other game apparatuses.

* * * * *